Patented Nov. 18, 1947

2,431,206

UNITED STATES PATENT OFFICE 2,431,206

CONVERSION OF HYDROCARBON OILS

William E. Spicer and Jerry A. Pierce, Baton Rouge, La., assignors to Standard Oil Development Company, a corporation of Delaware No Drawing. Application November 20, 1946, Serial No. 711,192

7 Claims. (Cl. 196—52)

This invention relates to the conversion of hydrocarbon oils and forms a continuation-in-part of our earlier application Serial No. 499,233, filed August 19, 1943, which in turn is a continuation-in-part of our application Serial No. 454,402, filed August 11, 1942. The present case is also a continuation-in-part of our case, Serial No. 689,183, filed August 8, 1946.

The invention is directed particularly to the preparation of catalysts produced from natural clays for the conversion of hydrocarbon oils. The catalysts so prepared are particularly suitable for fluid catalytic conversion and can also be used in fixed bed units.

Activated clays prepared by acid treatment of the bentonite type of clays have been commonly used for the treatment of hydrocarbon oils and particularly for the cracking, purifying and refining of such oils.

The common method of activating bentonite clays used for purification of oils is to digest the clay for several hours with acid followed by washing and drying. When employing sulfuric acid, the amount of acid normally used ranges between 20% and 40% of the weight of the clay.

More recently, it has been found that by giving the clay a more drastic treatment with the acid, such as from 0.5 to 1.5 parts of 96–100% concentrated sulfuric acid per part of clay by weight, the resulting product has a relatively high catalyst activity for the conversion of hydrocarbon oils. To use the acid it is diluted down to about 12% by weight sulfuric acid. The heavy acid treatment normally results in the removal of a substantial amount of alumina. It has also been found, as pointed out in our earlier applications, Serial No. 454,402 and Serial No. 689,183, that the quality of products may also be improved by reimpregnating the clay with alumina following the acid treatment. The reimpregnation can be accomplished by soaking the acid-treated clay with an aluminum salt solution such as aluminum sulfate solution, followed by precipitation of aluminum hydroxide with ammonium hydroxide. The term "modified clays" as herein employed means a bentonite clay which has been initially treated with a relatively large dosage of acid amounting to 0.5 to 1.5 parts of acid per part of clay by weight. This treatment may be followed by the reintroduction of a small amount of alumina, such as from 0.5 to 5% by weight on the clay. A more complete description of the method of preparing modified clays is set forth in our earlier applications, Serial Nos. 454,402 and 689,183, above mentioned. Clays of the character described in applications Serial No. 454,402 and Serial No. 689,183 may be treated according to the present invention to produce catalysts.

The modified clays prepared as above described produce a higher yield of more valuable products than are obtained by activated clays prepared according to the conventional procedure. For example, modified clays produce a higher yield of butane and butenes and also form a gasoline having a higher knock rating than is obtained by employing activated clays prepared by the conventional procedure. One objection, however, to the use of such clays for the conversion of hydrocarbon oils is that they tend to become deactivated by the presence of steam at high temperature, such as of the order of from 950° F. to 1200° F.

We have found that the introduction of a relatively small amount of magnesium oxide into the modified clays tends to reduce the deactivating effect caused by steam. The effect of magnesium oxide on the stability of the catalyst in the presence of steam at elevated temperatures is shown in the following examples:

Example 1

A bentonite clay was initially digested with 0.75 part of 100% sulfuric acid per part of clay. The concentration of the acid was about 12%. The digesting treatment was carried out for six hours, after which the product was washed and treated with an aluminum sulfate solution having a concentration capable of precipitating about 1% of alumina by weight on the clay. This product was then treated with ammonium hydroxide to precipitate aluminum hydroxide and the treated product washed, dried and made into pellets. The cracking activity of the catalyst was determined by passing an East Texas gas oil of about 33.8° A. P. I. gravity through a cracking chamber containing the catalyst at a temperature of about 850° F., a space velocity of about 0.6 volumes of liquid feed per volume of catalyst per hour for a two-hour period. The catalyst was then regenerated to remove combustible deposits and the cracking cycle repeated. The vapor products were cooled to condense all of the liquid hydrocarbons including butane constituents. The products were redistilled, and the volume distilled below 400° F. was found to be 49.5% in both of the cracking cycles.

Example 2

Catalysts prepared as described in Example 1 were first treated in a steam atmosphere at 1050° F. This steam-treated product, when tested under conditions set forth in Example 1, gave a gasoline yield of only 44.5%, thus showing that the steam treatment reduced the activity 5%.

Example 3

A catalyst was prepared as in Example 1, except that about 0.5% of magnesium oxide by weight on the clay was incorporated into the catalyst following the acid treatment in addition to the alumina. This product, when tested under conditions described in Example 1, gave a gasoline yield of 47.5% during the first two cycles.

Example 4

The catalyst described in Example 3 was treated in a steam atmosphere for 8 hours at a temperature of 1050° F. and thereafter tested as described in Example 1. The steam-treated product produced a gasoline yield of about 46.5 volume percent during the first two cycles.

From a comparison of Examples 3 and 4 it will be noted that the steam treatment reduced the activity of the catalyst containing the added magnesium oxide only 1% as compared to 5% for the catalyst to which no magnesium oxide had been added.

The amount of magnesium oxide incorporated into the acid treatment may range from 0.1 to 5% or more by weight on the clay, the preferred amount being between 0.5 and 1.5%.

While magnesium oxide has been found particularly effective, other alkaline earth metal oxides, such as calcium oxide and barium oxide may also be capable of producing substantially the same result. These various oxides may be incorporated into the pretreated clay by precipitation in any known manner from the soluble salts of the corresponding metals, e. g. by precipitation from the corresponding nitrates, chlorides and sulphates.

We claim:

1. The process for cracking hydrocarbon oils which comprises passing the oil to be cracked in contact with a catalyst formed by treating a bentonite clay with 0.5 to 1.50 parts of 100% sulfuric acid diluted to about 12% concentration by weight per part of clay by weight for a length of time effective to remove a substantial amount of the alumina content of said clay and thereafter incorporating from 0.1 to 5% magnesia by weight therein and keeping said oil vapors in contact with the clay at the cracking temperature for a period sufficient to convert a substantial portion thereof into lower boiling hydrocarbons.

2. The method of preparing a catalyst for the conversion of hydrocarbon oils which comprises treating a bentonite clay with 0.5 to 1.50 parts of 100% sulfuric acid diluted to about 12% concentration by weight per part of clay by weight for a length of time effective to remove a substantial amount of the alumina content of said clay and thereafter incorporating from 0.1 to 5% magnesia by weight therein.

3. The process for cracking hydrocarbon oils which comprises passing the oil to be cracked in contact with a catalyst formed by treating a bentonite clay with 0.5 to 1.50 parts of 100% sulfuric acid diluted to about 12% concentration by weight per part of clay by weight for a length of time effective to remove a substantial amount of the alumina content of said clay and thereafter incorporating from 0.1 to 5% magnesia by weight therein and also 0.1 to 5% alumina by weight therein and keeping said oil vapors in contact with the clay at the cracking temperature for a period sufficient to convert a substantial portion thereof into lower boiling hydrocarbons.

4. The method of preparing a catalyst for the conversion of hydrocarbon oils which comprises treating a bentonite clay with 0.5 to 1.50 parts of 100% sulfuric acid diluted to about 12% concentration by weight per part of clay by weight for a length of time effective to remove a substantial amount of the alumina content of said clay and thereafter incorporating from 0.1 to 5% magnesia by weight and also 0.1 to 5% alumina by weight therein.

5. A catalyst for the conversion of hydrocarbon oils characterized by its stability in the presence of steam at elevated temperatures and prepared by treating a bentonite clay with 0.5 to 1.50 parts of 100% sulfuric acid diluted to about 12% concentration by weight per part of clay by weight for a length of time effective to remove a substantial amount of the alumina content of said clay and thereafter incorporating from 0.1 to 5% magnesia by weight therein.

6. A catalyst for the conversion of hydrocarbon oils characterized by its stability in the presence of steam at elevated temperatures and prepared by treating a bentonite clay with 0.5 to 1.50 parts of 100% sulfuric acid diluted to about 12% concentration by weight per part of clay by weight for a length of time effective to remove a substantial amount of the alumina content of said clay and thereafter incorporating from 0.1 to 5% magesia by weight and also 0.1 to 5% alumina by weight therein.

7. A process for cracking hydrocarbon oils which comprises passing the oil to be cracked in contact with a catalyst formed by treating a bentonite clay with 0.75 part of concentrated sulfuric acid diluted to about 12% concentration by weight per part of clay by weight for a time effective to remove a substantial amount of the alumina of the clay and thereafter incorporating therein about 0.5% magnesia by weight on the clay and keeping the oil vapors in contact with the treated clay catalyst at the cracking temperature for a time sufficient to convert a substantial portion thereof into lower boiling hydrocarbons.

WILLIAM E. SPICER.
JERRY A. PIERCE.

REFERENCES CITED

The following references are of record in the file of this patent:

UNITED STATES PATENTS

| Number | Name | Date |
| --- | --- | --- |
| 2,320,799 | Ruthruff | June 1, 1943 |
| 2,078,945 | Houdry | May 4, 1937 |
| 1,837,971 | Joseph | Dec. 22, 1931 |
| 1,926,148 | Huber | Sept. 12, 1933 |
| 2,326,166 | Pier et al. | Aug. 10, 1943 |
| 2,141,185 | Houdry | Dec. 27, 1938 |
| 2,288,874 | Anderson et al. | July 7, 1942 |
| 2,319,590 | Eastman et al. | May 18, 1943 |
| 1,784,509 | Baylis | Dec. 9, 1930 |
| 1,397,113 | Prutzman | Nov. 15, 1921 |

FOREIGN PATENTS

| Number | Country | Date |
| --- | --- | --- |
| 490,853 | Great Britain | Aug. 23, 1938 |

OTHER REFERENCES

Dunstan et al., "Science of Petroleum," vol. III, pages 1686–7, published 1938 by Oxford University Press, N. Y. (Copy in Division 31.)